INVENTOR
JOHN WHITMORE
ATTORNEYS

June 24, 1930.   J. WHITMORE   1,766,237
DUST COLLECTOR OR SEPARATOR
Filed Nov. 16, 1925   4 Sheets-Sheet 3
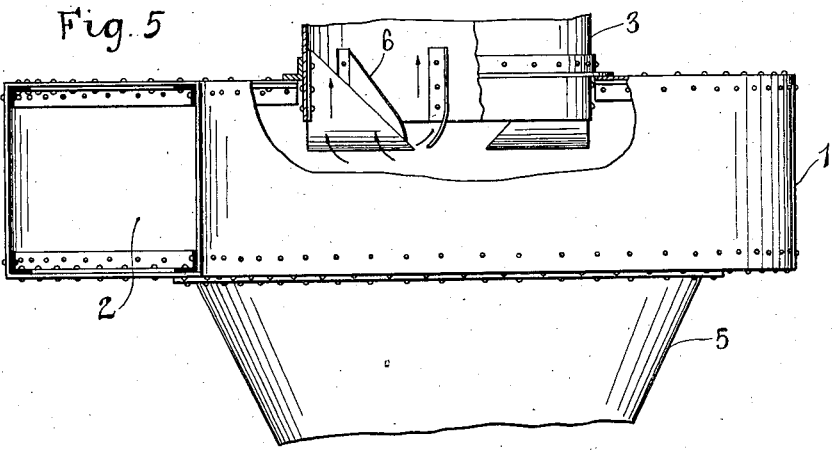
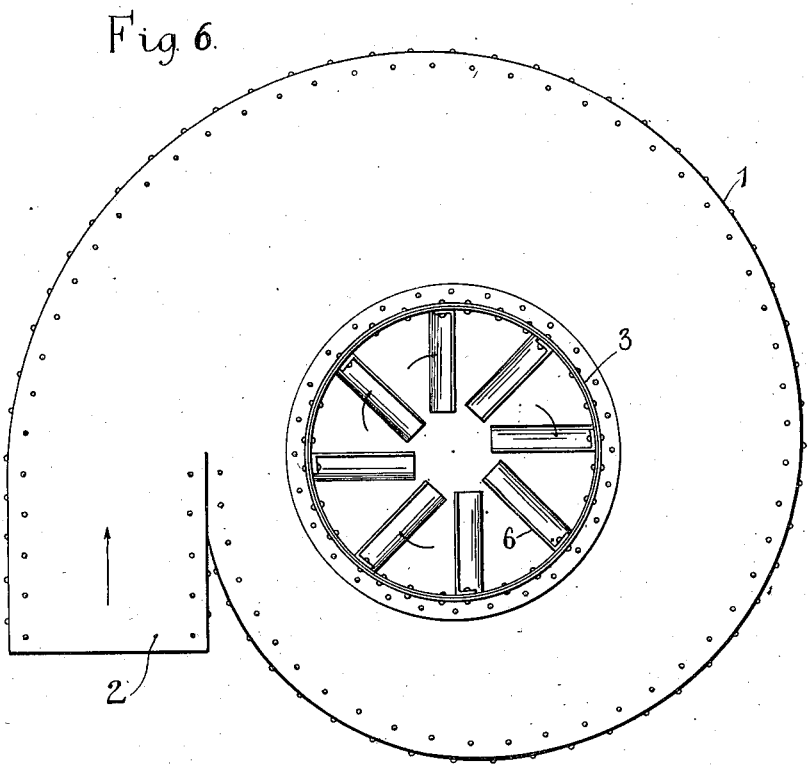
INVENTOR
JOHN WHITMORE
BY
ATTORNEYS

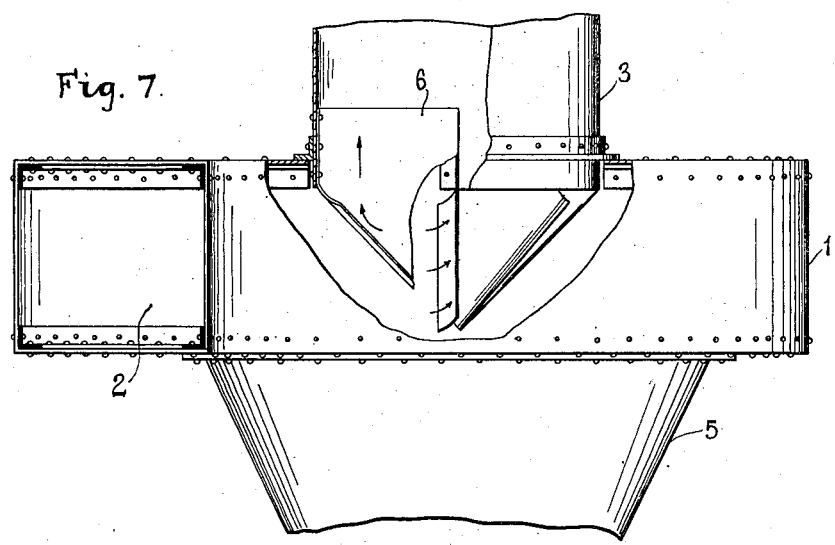
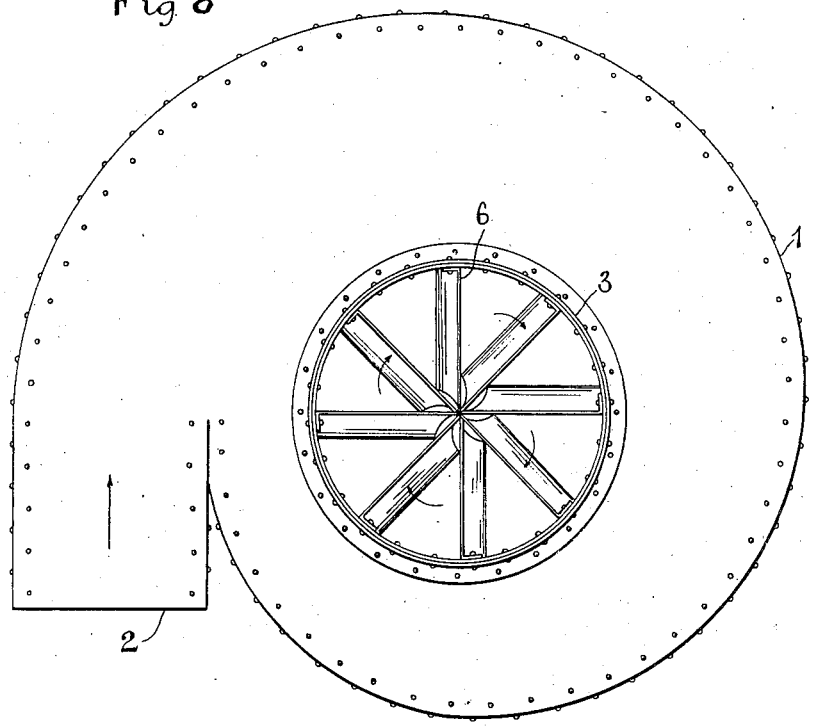

Patented June 24, 1930

1,766,237

UNITED STATES PATENT OFFICE

JOHN WHITMORE, OF BELFAST, IRELAND, ASSIGNOR TO DAVIDSON & COMPANY LIMITED, OF BELFAST, IRELAND

DUST COLLECTOR OR SEPARATOR

Application filed November 16, 1925, Serial No. 69,393, and in Great Britain March 14, 1925.

This invention relates to dust collectors or separators.

The object of the invention is to provide means designed to facilitate the escape of the air or gas from a dust collector after separation of the dust has been effected.

The improvement according to the present invention consists in the arrangement of means such as a set of blades, vanes or the like in or at the air or gas outlet from the vortex chamber, in such a manner that the whirling motion of the purified air or gas is converted without shock into a combined radial inward flow towards the axis of the said outlet, and an upward flow parallel to said axis thus facilitating the escape of the purified air or gas and consequently reducing the resistance to the passage of fluid within the apparatus.

In order that the nature of the invention may be clearly understood constructions embodying the same will now be described with the aid of the accompanying drawings, in which Fig. 1 is a sectional view of my improved dust collector showing a part of the guide vanes in elevation;

Fig. 5 is an elevation of still another modified form, partly broken away;

Fig. 6 is a plan view of construction shown in Fig. 5;

Fig. 7 is an elevation of yet another modified form partly broken away; and

Fig. 8 is a plan view of the construction shown in Fig. 7.

Figure 1:
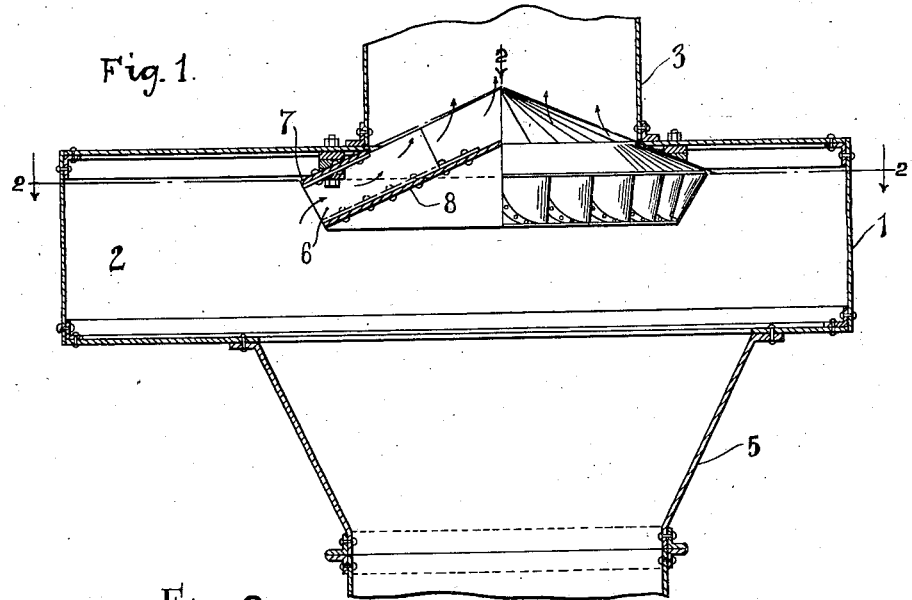
Figure 2:
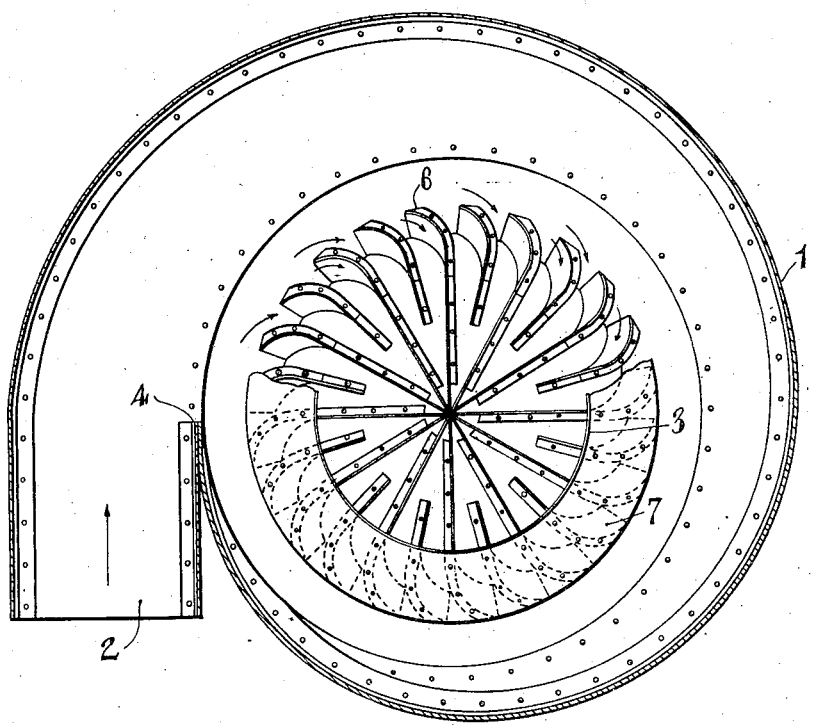
Fig. 2 is a sectional view taken on the line 2—2 of Fig. 1 and looking in the direction of the arrows.

Referring to Fig. 1 of the drawings, a number of stationary guide vanes 6 are arranged in pyramidal form radiating from a common centre coincident with and inclined to the vertical axis of the air outlet pipe 3. The outer ends of the vanes extend downwards and outwards beneath the opening of the said outlet pipe 3, and into the volute constituting the separating chamber 1. The lower ends of the vanes 6 are curved and tend towards the direction in which the air is rotated and consequently are adapted to, as it were, cut into the whirling air, and change the direction of flow into a direction substantially parallel to the axis of the air outlet 3. Said vanes 6 may be enclosed between a conical member 8 at the under side and a truncated conical portion 7, at the upper side of the vanes, the whole being secured in the dust collector in any approved manner.

The outlet area from the truncated cone 7 may be any suitable proportion compared with the area of the air outlet pipe 3. As shown in the drawing the vanes 6 are radial and are alternately long and short. If desired, however, same may be all of the same length, and may unite or meet at the centre, or again may only approach to within a certain distance of the centre, while a further modification would comprise a system of vanes, a number of which may extend to the centre and between each pair of which shorter vanes of varying length might be arranged.

It will readily be understood from the foregoing that, as the whirling air is caused to enter the space between the vanes by the formation or angle of the intake edges of same, the air would flow over the surface of the vanes and would enter the outlet pipe 3 in a linear direction, all rotary movement of the air being thus converted into a combined inward and upward flow. The resistance in outlet pipe 3 would therefore be very much less than if the air were travelling through same in a helical fashion, as would be the case in the absence of said vanes.

Figure 3:
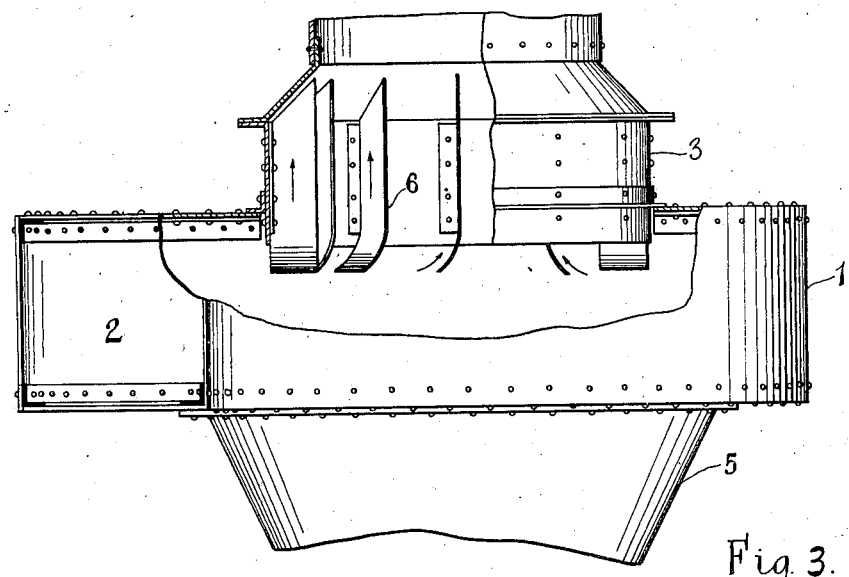
Fig. 3 is an elevation of a modified form of dust collector partly broken away to show the interior construction.
Figure 4:
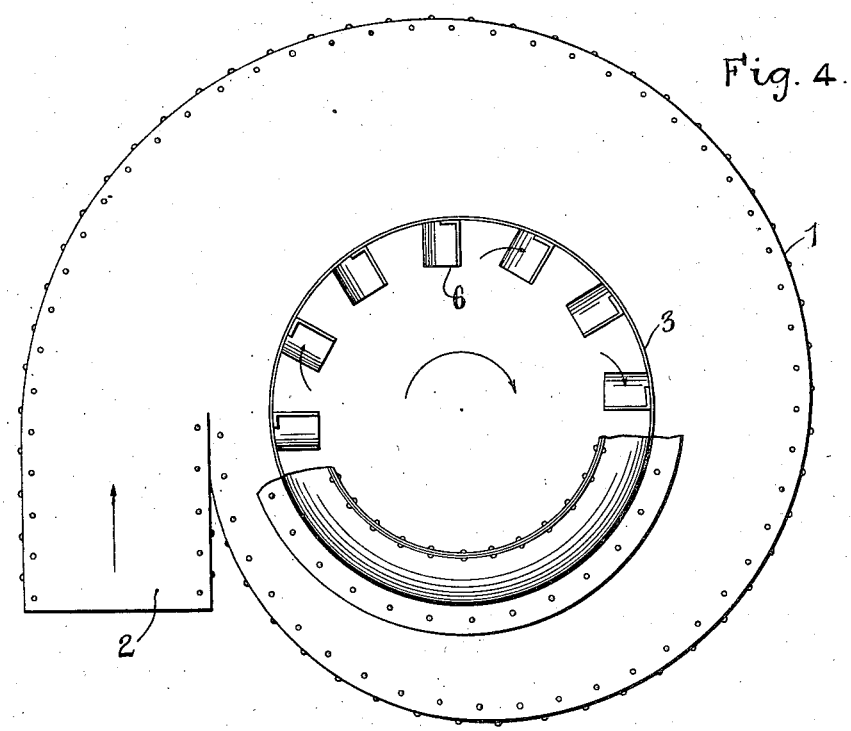
Fig. 4 is a plan view of the device shown in Fig. 3, partly broken away to show the construction of the guide vanes.

Figs. 3 and 4 show a construction in which the lower part of the air outlet pipe 3 is enlarged, and the stationary vanes 6 are arranged in the space thus formed by the difference in diameter of the outlet pipe 3, and the enlarged portion respectively; the inner edges of the vanes may project inwards until same are flush with the inner surface of the outlet pipe 3. In this case the lower curved ends of the vanes project downwards for some distance past the end of the enlargement.

Figs. 5 and 6 show in elevation and plan a modification in which the guide vanes 6 are arranged inside the outlet pipe 3, as in Fig. 3, but in this case said vanes are deeper at the periphery of the outlet and as they approach the centre their vertical depth diminishes and the lower edges are curved and lie in the same plane as hereinbefore described.

In the construction shown in Figs. 7 and 8 the vanes 6 take the form of an inverted pyramid arranged at the lower end of air outlet pipe 3. The conical portion of the vanes is curved along their inclined edges in order to meet and divert the flow of the whirling air into the required direction, as explained above. Any desired number of vanes may be employed and same may project up into the outlet pipe 3 and at the same time, as shown in the illustration, project downwards into the volute 1, the distance being subject to modification as well as the angle of the leading edge of the vanes.

In the following claims the term "gas" includes both gas and air.

What I claim and desire to secure by Letters Patent is:—

1. In dust collectors, separators and the like, the combination with a vortex chamber in which the separation takes place under the action of centrifugal force, of an inlet thereto for the dust-laden gas arranged tangential to the maximum radius of the chamber, a gas outlet therefrom arranged in the upper side of the chamber with its lower end situated between planes coinciding with the top and bottom edges of the inlet respectively, a set of guide vanes projecting into the lower end of said outlet and extending partly above and partly below the top of the said tangential inlet in order to convert the whirling motion of the gas to a linear motion parallel to the axis of the outlet.

2. In dust collectors, separators and the like, the combination with a vortex chamber in which the separation takes place under the action of centrifugal force, of an inlet thereto for the dust laden gas arranged tangential to the maximum radius of the chamber, a gas outlet therefrom arranged in the upper side of the chamber with its lower end situated between planes coinciding with the top and bottom edges of the inlet respectively, and a set of stationary guide vanes arranged in pyramidal form and attached to the lower end of the said outlet, a truncated cone secured on the upper edges of the vanes, a conical member secured to the under edges of the vanes, and curved outer ends being provided on the vanes adapted to divert the whirling gas along the surface of the vanes into the outlet.

3. In dust collectors, separators, and the like, the combination with a vortex chamber in which the separation takes place under the action of centrifugal force, of an inlet thereto for the dust laden gas arranged tangential to the maximum radius of the chamber, a gas outlet therefrom arranged in the upper side of the chamber with its lower end situated between planes coinciding with the top and bottom edges respectively, and a set of stationary guide vanes symmetrically arranged in pyramidal form and attached to the lower end of the said outlet, comprising alternate long and short radial vanes, the longer extending to, or near, the centre, a conical member securing all the vanes together on their under edges and a truncated conical member secured upon the upper edges of the vanes, where same extend outwards from said outlet and into the vortex chamber, the ends of said vanes extending from the outlet being formed so as to divert the whirling gas from the periphery inwards along the surface of the vanes into said outlet.

4. In dust collectors, separators and the like, the combination with a vortex chamber in which the separation takes place under the action of centrifugal force, of an inlet thereto for the dust-laden gas arranged tangential to the maximum radius of the chamber, a gas outlet therefrom arranged in the upper side of the chamber with its lower end situated between planes coinciding with the top and bottom edges of the inlet respectively, and a set of guide vanes projecting into the lower end of the said outlet and extending partly above and partly below the top of the said tangential inlet, each vane being arranged in a plane containing the axis of the outlet duct and projecting inwards, the lower edges of the vanes being curved forward, and projecting below the plane of the outlet duct in order to meet the on-coming whirling gas, so that the latter may be caused to enter the spaces between the vanes and to flow over the surface of same without shock.

5. In dust collectors, separators, and the like the combination with a volute white-shaped vortex chamber in which the separation takes place under the action of centrifugal force, of an inlet thereto for the dust laden gas arranged tangential to the maximum radius of the chamber, a gas outlet therefrom arranged in the upper side of the chamber with its lower end situated between planes coinciding with the top and bottom edges of the inlet respectively, and a set of stationary guide vanes symmetrically arranged in pyramidal form and attached to the lower end of the said outlet having a number of alternately long and short vanes, that portion of all the said vanes which projects inside the volute top of the dust collector or separator, and external to the outlet, being enclosed between a truncated conical portion on their upper edges and a cone on their lower edges, thus leaving the periphery open so as to divert the whirling gas along the surface of the vanes into said outlet.

6. In dust collectors, separators and the like, in combination, a volute vortex chamber having a flat substantially horizontal roof and its axis substantially vertical, an inlet thereto for the dust-laden gas arranged tangential to the maximum radius of the chamber and having its flat upper side continuous with the flat roof of the vortex chamber, a gas outlet from the vortex chamber coaxial therewith, the wall of the outlet supported directly from the flat roof of the vortex chamber, and a set of guide vanes arranged with their lower ends extending into the vortex chamber below the lower edge of the outlet and their upper ends extending into the outlet above the level of the flat roof of the vortex chamber and its inlet.

In testimony whereof I affix my signature.

JOHN WHITMORE.